(12) United States Patent
Canedo et al.

(10) Patent No.: US 12,321,147 B2
(45) Date of Patent: Jun. 3, 2025

(54) QUEUE BLOCKS FOR FLEXIBLE AUTOMATION ENGINEERING PROGRAMS

(71) Applicant: Siemens Aktiengesellschaft, Munich (DE)

(72) Inventors: Arquimedes Martinez Canedo, Plainsboro, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 602 days.

(21) Appl. No.: 17/641,680

(22) PCT Filed: Sep. 19, 2019

(86) PCT No.: PCT/US2019/051817
§ 371 (c)(1),
(2) Date: Mar. 9, 2022

(87) PCT Pub. No.: WO2021/054954
PCT Pub. Date: Mar. 25, 2021

(65) Prior Publication Data
US 2022/0299967 A1    Sep. 22, 2022

(51) Int. Cl.
*G05B 19/05* (2006.01)

(52) U.S. Cl.
CPC ......... *G05B 19/052* (2013.01); *G05B 19/054* (2013.01); *G05B 19/056* (2013.01); *G05B 2219/1204* (2013.01)

(58) Field of Classification Search
CPC .. G05B 19/052; G05B 19/054; G05B 19/056; G05B 2219/1204

USPC ............................................................ 700/7
See application file for complete search history.

(56) References Cited

U.S. PATENT DOCUMENTS

| | | | | |
|---|---|---|---|---|
| 6,915,330 B2* | 7/2005 | Hardy | ........................ | H04L 9/40 700/83 |
| 7,269,468 B2* | 9/2007 | Law | .................... | G05B 19/0426 700/86 |
| 7,286,885 B2* | 10/2007 | Niwa | .................... | G05B 19/058 700/86 |
| 7,757,209 B2* | 7/2010 | Fukui | .................... | G05B 19/056 717/109 |

(Continued)

FOREIGN PATENT DOCUMENTS

| CN | 1965298 A | 5/2007 |
|---|---|---|
| CN | 103235549 A | 8/2013 |

(Continued)

OTHER PUBLICATIONS

Design and Application of Queue-Buffer Communication Model in Pneumatic Conveying; by Zhang et al.; 5 pages; (IJACSA) International Journal of Advanced Computer Science and Applications, vol. 4, No. 10, 2013 (Year: 2013).*

(Continued)

*Primary Examiner* — Ronald D Hartman, Jr.

(57) ABSTRACT

A system for exchanging data in an automation environment is provided. The system includes at least one programmable logic controller (PLC A) containing program instructions executable by the at least one programmable logic controller and a queue block (50) configured to dynamically exchange data between the program instructions of the PLC and a data consumer (PLC C, PLC D).

14 Claims, 4 Drawing Sheets

(56) References Cited

U.S. PATENT DOCUMENTS

| | | | |
|---|---|---|---|
| 8,166,237 B1 | | 4/2012 | Atsatt et al. |
| 8,255,065 B2 * | | 8/2012 | Lu .................. G05B 19/056 700/86 |
| 8,560,093 B2 * | | 10/2013 | Ikegami ............... G06F 8/20 700/86 |
| 2002/0124011 A1 * | | 9/2002 | Baxter ............. G05B 19/418 |
| 2010/0023139 A1 * | | 1/2010 | Ikegami ............... G06F 8/20 700/83 |
| 2015/0293785 A1 | | 10/2015 | Murphy |
| 2022/0276641 A1 * | | 9/2022 | Thomas ........... G05B 19/0423 |
| 2022/0342377 A1 * | | 10/2022 | Wang ................ G06N 3/045 |

FOREIGN PATENT DOCUMENTS

| | | | | |
|---|---|---|---|---|
| CN | 103901808 A | 7/2014 | | |
| CN | 106502817 A | 3/2017 | | |
| CN | 108369404 A | 8/2018 | | |
| EP | 2116913 A2 | 11/2009 | | |
| EP | 3371665 A1 | 9/2018 | | |
| WO | WO-2013113320 A1 * | 8/2013 | ........... | G05B 19/056 |
| WO | 2017027179 A1 | 2/2017 | | |

OTHER PUBLICATIONS

Function Block Programming Manual; Allen Bradley; 1336 Force PLC Communications Adapter; Cat. No. 1336T-Gt1EN; 180 pages; printed from the Internet on Oct. 25, 2024; Published Aug. 1995 (Year: 1995).*

Siemens Function blocks to control the SINAMICS with Simatic S7 in TIAPortal SINAMICS; Manual Jul. 2019; Printed from Internet on Oct. 25, 2024; 109 pages; Published Jul. 2019 (Year: 2019).*

Siemens Library of General Functions (LGF) for SF-1200/1500, Step 7 (TIA Portal V14 SP1; 129 pages; Printed from the Internet on Oct. 25, 2024; Published Oct. 2018 (Year: 2018).*

Alex Homer et al.; "云计算架构设计模式"; Translation: 新青年架鹅小组 ;Huazhong University of Science and Technology Press; Oct. 31, 2017; pp. 155-158.

International Search Report corresponding to application No. PCT/US2019/051817; 7 pages.

Alex Homer et al.; "云计算架构设计模式";Translation: 新青年架鹅小组 ; Huazhong University of Science and Technology Press; Oct. 31, 2017; pp. 155-158.

Unping Han et al:; "Research and implementation of programmable logic controller editing software."; Mechanical and Electrical Engineering Technology, 6; 2007-06-15.

* cited by examiner

QUEUE BLOCKS FOR FLEXIBLE AUTOMATION ENGINEERING PROGRAMS

This application is a national phase filing under 35 U.S.C. § 371 of International Patent Application No. PCT/US2019/051817, filed Sep. 19, 2019, which is incorporated herein by reference in its entirety.

BACKGROUND

1. Field

Aspects of the disclosure generally relate to programmable logic controllers (PLCs) for automated industrial processes. More specifically, a system for exchanging data in an automation environment is presented. The system includes a new block type for PLC programming, a queue block, which is configured to dynamically exchange data between two PLCs or between a PLC and another application hosted in another computer system.

2. Description of the Related Art

Currently, automation engineering programs are bound to a specific PLC. For example, Function Blocks (FBs), Functions (FCs) and Data Blocks (DBs) are associated with a specific PLC. In the context of PLC programming, Function Blocks utilize internal Data Blocks for data storage while Functions (FCs) only utilize temporary storage. Each PLC vendor has its own engineering environment and supports its own version of IEC 61131-3 (International Electrotechnical Commission standard for PLCs) programming languages such as Ladder Diagram (LAD), Sequential Function Chart (SFC) and Structured Control Language (SCL). A FB/FC developed for one PLC is not portable or interoperable with another FB/FC from another PLC without a very large integration effort. When two PLCs communicate values to one another, the automation program uses special FB/FCs to invoke communication through an industrial communication protocol such as Profinet. This engineering paradigm is inflexible because it prescribes a specific hardware configuration for that automation program. Any changes in the hardware, trigger a redesign of the software. Likewise, any changes in the software, trigger a validation of the hardware. Thus, this leads to additional engineering efforts that are time consuming and expensive.

Previous efforts have been made in order to make PLC programs interoperable. Such efforts include adapting the PLC program to the PLC supporting standards such as OPC UA (Open Platform Communications Unified Architecture). The data model, which are designed to store known data structures, of the PLC first has to be mapped to the data model of the standard and then be mapped to the data model of another PLC. Furthermore, the integration effort is project specific and is hardly reusable in a different project. If the PLCs do not support a common standard, then even larger integration efforts must be made based on the opening interfaces (e.g. Software Development Kit (SDK) and Open Development Kit (ODK)) provided by each PLC.

Flexibility in automation engineering programs has been traditionally achieved through software architecture best practices. The goal is to use automation software design patterns to make software redesign and maintenance easy. However, this does not solve the problem described above, i.e., any changes to the software or hardware still trigger re-engineering. Consequently, flexible automation engineering programs that can exchange data in a more efficient manner are desired.

SUMMARY

Briefly described, aspects of the present disclosure relate to a system for exchanging data in an automation environment and a computer implemented method to exchange data between a programmable logic controller and a data consumer in an automation system.

A first aspect provides a system for exchanging data in an automation environment. The system includes at least one programmable logic controller containing program instructions executable by the at least one programmable logic controller and a queue block configured to dynamically exchange data between the program instructions of the PLC and a data consumer.

A second aspect provides a computer implemented method to exchange data between a programmable logic controller and a data consumer in an automation system. The method includes the steps of providing a queue block for the dynamic exchange of data between a function block and a data consumer, the function block containing program instructions that are executable by the programmable logic controller, allocating the function block to the programmable logic controller via the queue block at runtime, and exchanging data from the programmable logic controller to the data consumer.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Generally, PLC programs comprise blocks that include user programs for the processing of specific automation tasks. Once programmed, these user programs may be loaded onto a controller of the PLC where they are executed cyclically. Traditionally, program blocks have been classified into various block types including organization blocks, function blocks (FBs), functions (FCs) and data blocks (DBs). This disclosure focuses primarily on the FB/FC and DB types. Functions are similar to FBs except that they do not have access to cyclic data storage. FBs contain the programming instructions while the DB provides data to the FBs as input parameters and provides storage for the output parameters. Thus, a DB may be described as an interface between different FBs/FCs.

Broadly, a system for exchanging data between programming logic controllers (PLCs) and/or another data consumer utilizing a queue block (QB) is proposed. The queue block is an interchangeable data type in a PLC to replace the traditional DB type. A specific QB may be implemented for each PLC. Once the QB is instantiated in a program, there need not be any change to the remaining PLC programs (e.g., OB, FB, FC, SFC (library System Function)) other than a configuration of a FB/FC to use the queue block instead of a DB. In programming terminology, all references to DBs may be replaced by references to QBs. The replacement may be accomplished either manually or automatically by the engineering tool.

Figure 1:
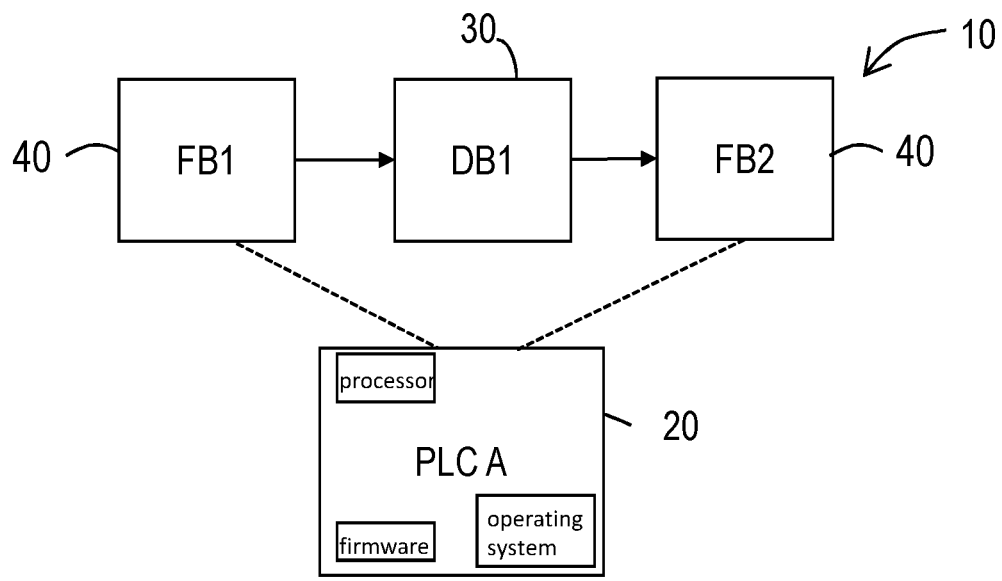
FIG. 1 illustrates a traditional PLC automation program using function blocks and data blocks.

Referring now to FIG. 1, a traditional PLC automation program 10 including FBs 40 and a DB 30 is shown. As shown, DB1 30 is the interface between FB1 40 and FB2 40 such that the data is exchanged between FB1 40 and FB 2 40 through DB1 30. This traditional approach forces the automation program 10 consisting of FB1→DB1→FB2 to be allocated to a specific hardware configuration (e.g. PLC A 20). The term programmable logic controller (PLC) as used herein refers to industrial computer control system that monitors the state of input devices and makes decisions based upon custom program instructions, typically located in a function/function block, to control the state of output devices. The PCL may include an operating system, firmware, and a processor.

Figure 2:
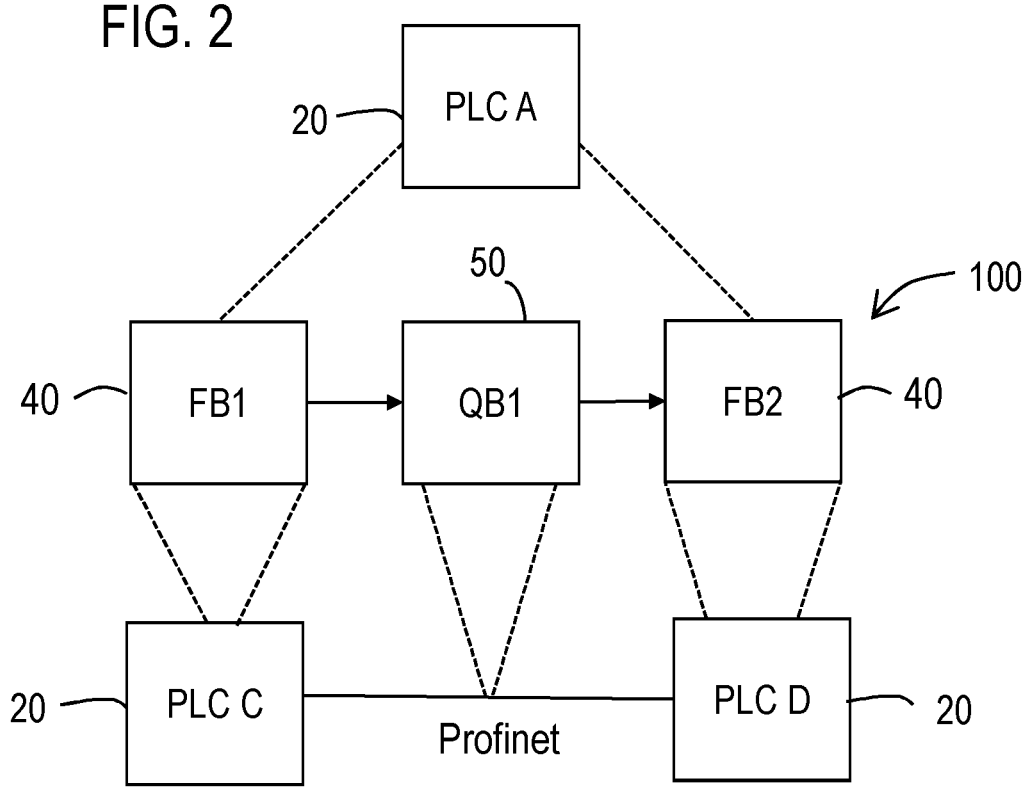
FIG. 2 illustrates a first embodiment of a PLC automation program using queue blocks.

With reference now to FIG. 2, an embodiment of a flexible automation program 100 using a queue block 50 is shown. The QB 50 is an explicit communication primitive (queue) that may be addressed by the automation program as if it were a DB. Thus, in the illustrated example of FIG. 2, QB1 50 replaces the DB1 30 of the automation program 10. However, in contrast to a DB, a QB can decouple the execution from the communication. So, for example, with the introduction of QB 50, the same program FB1→QB1→FB2 100 may be dynamically allocated during runtime to various hardware configurations such as to a single PLC, e.g., PLC A 20, as in the original program shown in FIG. 1 or to multiple PLCs, e.g., PLC C 20 and PLC D 20, as shown in FIG. 2. The QB exists in the runtime of the PLC. In an embodiment, the QB 50 may be implemented in the firmware of the PLC. Alternately, the QB 50 may be implemented in the operating system of the PLC.

Figure 3:
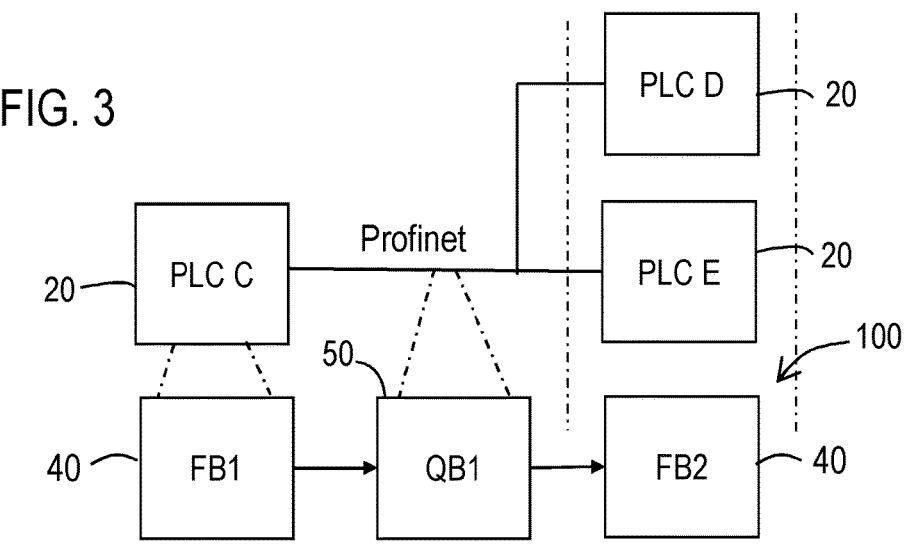
FIG. 3 illustrates a second embodiment of a PLC automation program using queue blocks.

In further embodiments, the QBs 50 enable high-availability and high redundancy configurations as shown in FIG. 3. Here, the QB 50 may dynamically allocate the automation program FB1→QB1→FB2 100 to a plurality of programmable logic controllers PLC C 20, PLC D 20, and PLC E 20 during runtime.

In an embodiment, the QBs 50 may be implemented utilizing messaging queues or message passing libraries such as ZeroMQ or RabbitMQ. Different communication patterns may be utilized by the QBs 50 depending on the source of the data to be exchanged, the configuration of PLCs, or the platforms used by the PLCs, for example. Either a programmer having knowledge of the specific application implemented or the runtime system while monitoring the state of the system may choose the communication pattern used. Additionally, depending on this state of the system/network, different communication patterns may be chosen to accomplish faster execution time, lower cycle time, etc. For example, the QBs 50 may offer the following different communication patterns:

Point to Point—a single producer and a single consumer.
Request-Reply—connects consumers to a producer through a communication broker.
Publication-Subscription—connects a set of publishers to a set of subscribers.
Map-Reduce—dataflow execution where consumers fire their computation when the receive an input from the producer.
Broadcast—a producer broadcasts information to the network.

While the QBs 50 may utilize any of the above-named communication patterns to exchange data between FBs 40 of different PLCs 20, other communication patterns not listed here may also be utilized by the QBs as well.

Figure 4:
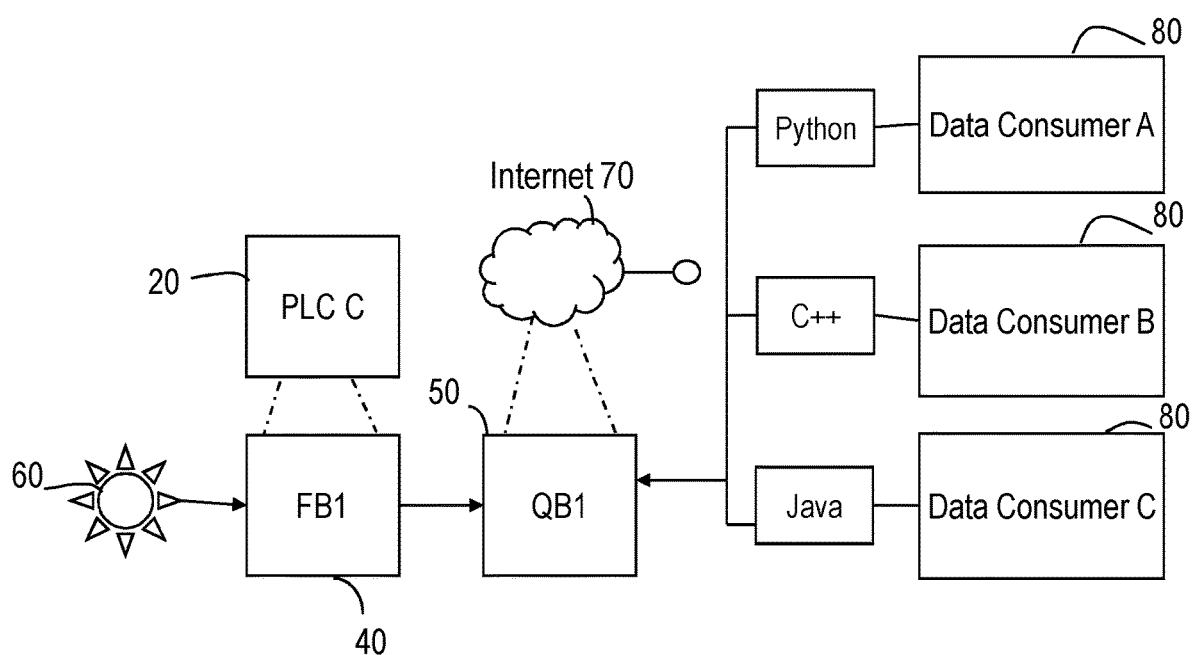
FIG. 4 illustrates a third embodiment of a PLC automation program using queue blocks.

In an embodiment, the message queuing capability of the QBs enable IoT communication as shown in FIG. 4 utilizing a communication pattern such as the publish-subscribe communication pattern. The publish-subscribe communication pattern is a messaging pattern where senders of messages, called publishers, do not program the messages to be sent directly to specific receivers, called subscribers, but instead categorize published messages into classes without knowledge of which subscribers, if any, there may be. Similarly, subscribers express interest in one or more classes and only receive messages that are of interest, without knowledge of which publishers, if any, there are. Referring now to the exemplary embodiment of FIG. 4, a sensor value from a sensor 60 in the automation environment may be published by FB 1 40 utilizing QB1 50 to data consumers, i.e., subscribers, that are authorized to read the value from the internet 70. The data consumers in this example may be non-PLC applications 80 written in different languages such as C, C++, Python, Java, etc. Thus, with QBs 50, multi-platform compatibility may be achieved. While a sensor value has been used in the exemplary embodiment, other values from further IoT devices may also be exchanged in the described manner.

Figure 5:
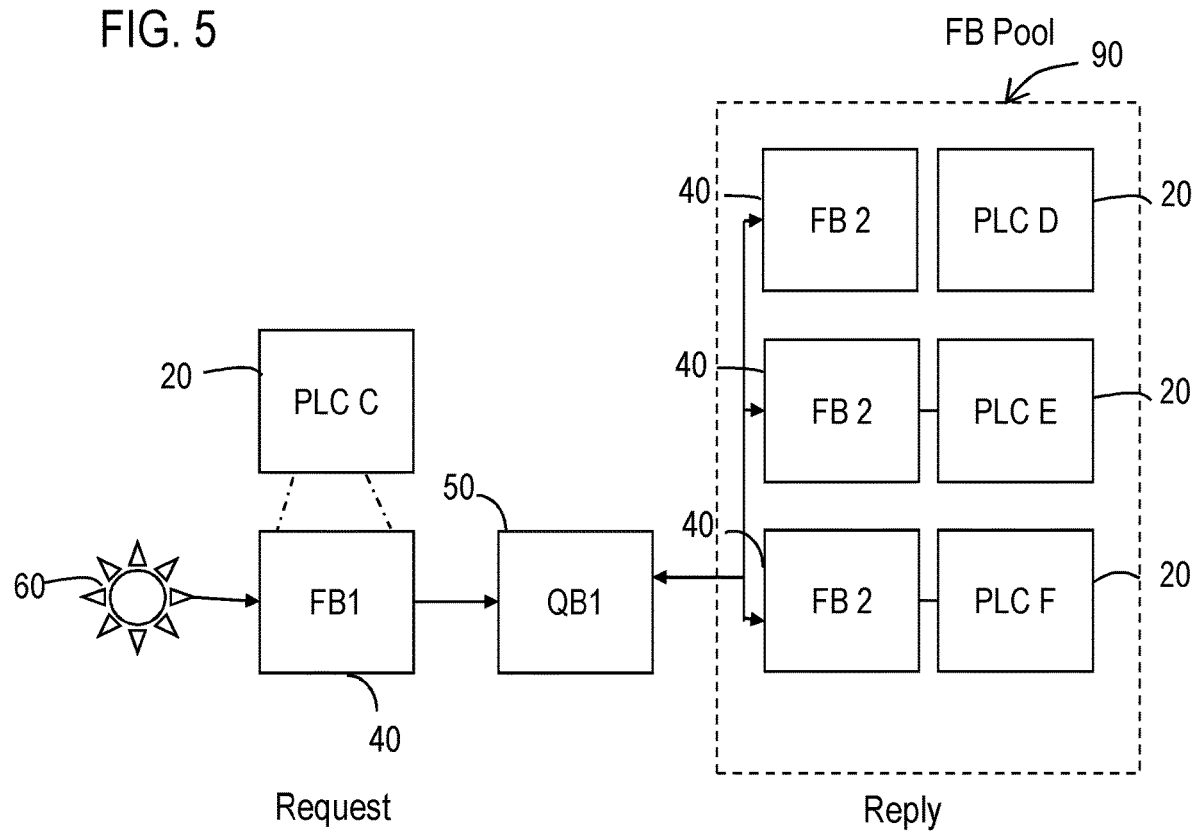
FIG. 5 illustrates a fourth embodiment of a PLC automation program using queue blocks.

In a further embodiment, the QB enables parallel and distributed computation patterns in the automation network. This will greatly benefit new applications that demand higher processing in the edge, as close to sensors 60, as possible. For example, referring FIG. 5, the function block FB1 40 allocated to PLC C 20 needs a computation on a sensor value from sensor 60 but FB1 40 does not have the computational capacity to get a result before a deadline. In an embodiment, QB1 50 utilizes the Request-Reply communication pattern of its messaging queue to allow more powerful PLCs 20 to perform the computation on FB2 40. In the shown embodiment, QB1 50 sends a request to a pool of PLCs 90, PLC C, PLC E, and PLC F. Because these PLCs may be performing other tasks, the first one to read the sent message and is able to execute the computation responds to the request and sends the result back to FB 1 40 before the deadline is missed.

Figure 6:
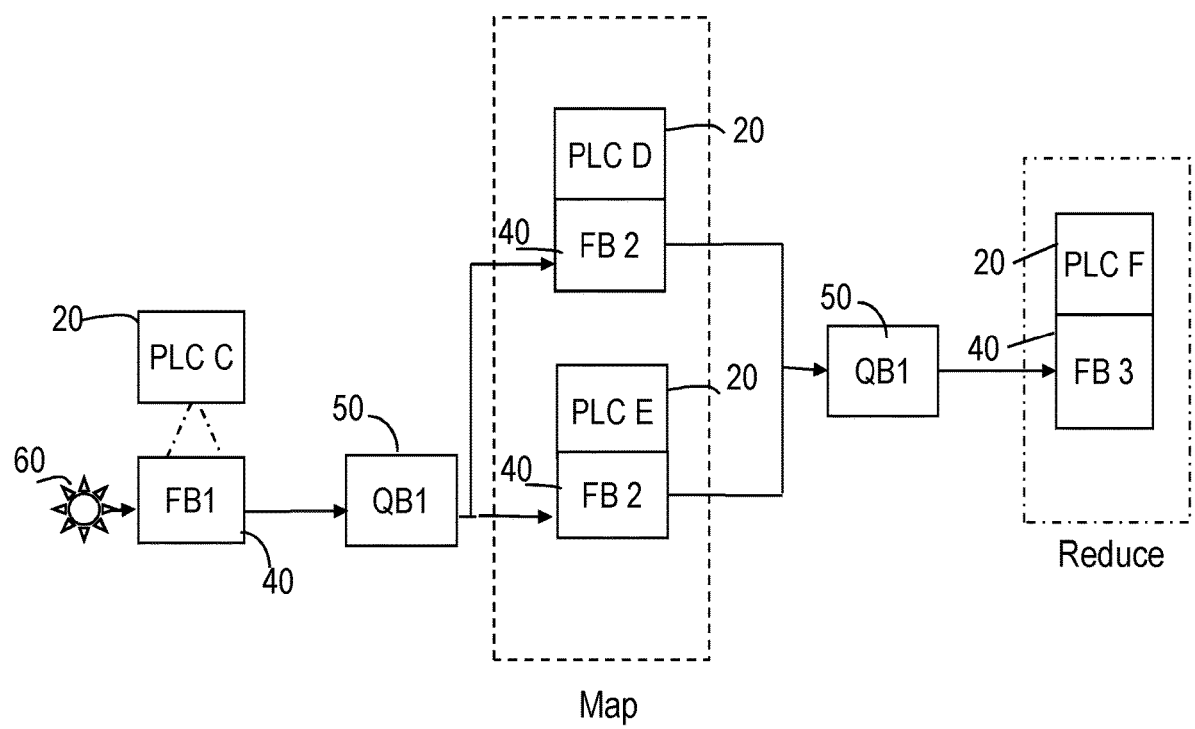
FIG. 6 illustrates a fifth embodiment of a PLC automation program using queue blocks.

FIG. 6 illustrates another example of the distributed and parallel processing capability of an automation system utilizing QBs 50. In this example, a complex computation is split into two PLCs, PLC D 20 and PLC E 20. using the Map-Reduce communication pattern from the messaging queue. The Map Reduce Communication Pattern includes a mapping function which performs filtering and/or sorting of the input data into tasks. Then, the reduce function performs a summary operation. In the illustrated example, a complex computation on a sensor value from sensor 60 may be split into two PLCs, PLC D 20, and PLC E 20. After the FB2 40 of PLC D 20 and PLC E 20 finishes their part of the computation, the results may be gathered for final processing in FB3 40.

Queue blocks offer many advantages over the traditional inflexible data block. For example, QBs enable multi-platform implementations of automation networks wherein PLCs can freely communicate with one another and to other non-PLC applications. Programs from one PLC can be easily migrated to other PLCs because they are no longer bound to a specific hardware. In addition, the queue blocks allow for parallel and distributed processing by utilizing message queues of the QBs. New nodes may be added or removed as the computation demand arises. Automation engineering programs, by utilizing queue blocks, and now dynamically exchange data with the result that they are no longer fixed to a particular configuration but can adapt to different runtime conditions. In summary, queue blocks offer flexibility in the automation system so that data may be easily exchanged between PLCs as well as non-PLC applications.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for exchanging data in an automation environment, comprising:
   a programmable logic controller containing program instructions, the program instructions executable by the programmable logic controller; and
   a queue block configured to dynamically exchange data between the program instructions of the programmable logic controller and a data consumer during runtime,
   wherein the queue block further comprises a messaging queue for communication between the programmable logic controller and the data consumer,
   wherein the messaging queue supports a plurality of communication patterns selected from the group consisting of point-to-point, request-reply, publication-subscription, map-reduce, broadcast, and combinations thereof, and
   wherein a data value is exchanged between the program instructions of the programmable logic controller and the data consumer utilizing the communication pattern publication-subscription of the messaging queue over the internet so that the data value is published by the messaging queue to subscribed clients that are authorized to read the data value from the internet.

2. The system as claimed in claim 1, wherein the program instructions are implemented within a function block within the programmable logic controller.

3. The system as claimed in claim 2,
   wherein the data consumer is a further programmable logic controller having a further function block containing program instructions, the program instructions executable by the further programmable logic controller, and
   wherein the data is exchanged between the function block and the further function block.

4. The system as claimed in claim 2, wherein the queue block dynamically allocates the function block to a plurality of programmable logic controllers during runtime.

5. The system as claimed in claim 1, wherein the data consumer is a non-programmable logic controller application.

6. The system as claimed in claim 1, wherein the queue block is implemented in the firmware or in the operating system of the programmable logic controller.

7. The system as claimed in claim 1, wherein the data value is a value from an IoT device.

8. The system as claimed in claim 7, wherein the IoT device is a sensor within the automation environment.

9. The system as claimed in claim 1, wherein queue block via the messaging queue allows for parallel and distributed computation in the programmable logic controller.

10. A computer implemented method to exchange data between a programmable logic controller and a data consumer in an automation system, comprising:
    providing a queue block for dynamic data exchange between a function block and the data consumer, the function block containing program instructions that are executable by the programmable logic controller;
    allocating the function block to the programmable logic controller via the queue block at runtime;
    exchanging data between the programmable logic controller and the data consumer;
    the method further comprising receiving, via the function block, a data value corresponding to an IoT device in the automation system,
    publishing, via a messaging queue of the queue block, the data value to the data consumer; and
    reading the data value over the internet by the data consumer.

11. The method of claim 10, wherein the data consumer is a further programmable logic controller having a further function block containing program instructions, the program instructions executable by the further programmable logic controller, and
    wherein the exchanging comprises exchanging data between the function block and the further function block.

12. The method as claimed in 10, wherein the data consumer is a non-PLC application.

13. A computer implemented method to exchange data between a programmable logic controller and a data consumer in an automation system, comprising:
    providing a queue block for dynamic data exchange between a function block and the data consumer, the function block containing program instructions that are executable by the programmable logic controller;
    allocating the function block to the programmable logic controller via the queue block at runtime;
    exchanging data between the programmable logic controller and the data consumer;
    distributing, via a messaging queue of the queue block, a computation to a plurality of further function blocks;
    the method further comprising receiving, via the function block, a data value corresponding to an IoT device in the automation system,
    requesting the computation to be executed on the data value via the messaging queue of the queue block from a pool of function blocks comprising the plurality of further function blocks, each function block of the pool allocated to a further programmable logic controller and containing program instructions executable by the further programmable logic controller, and
    replying, by a function block of the pool of function blocks, the executed computation on the data value.

14. A computer implemented method to exchange data between a programmable logic controller and a data consumer in an automation system, comprising:
- providing a queue block for dynamic data exchange between a function block and the data consumer, the function block containing program instructions that are executable by the programmable logic controller;
- allocating the function block to the programmable logic controller via the queue block at runtime;
- exchanging data between the programmable logic controller and the data consumer;
- distributing, via a messaging queue of the queue block, a computation to a plurality of further function blocks;
- the method further comprising receiving, via the function block, a data value corresponding to an IoT device in the automation system,
- mapping the computation to be executed on the data value via the messaging queue of the queue block to the plurality of further function blocks, each further function block allocated to a respective further programmable logic controller and containing instructions executable by the further programmable logic controller, and
- reducing, via the queue block, the computation to a function block of the plurality of further functions blocks.

* * * * *